United States Patent [19]

Mozer et al.

[11] Patent Number: 5,044,713

[45] Date of Patent: Sep. 3, 1991

[54] OPTICAL ISOLATOR

[75] Inventors: Albrecht Mozer, Bietigheim-Bissingen; Peter Kersten, Leonberg, both of Fed. Rep. of Germany

[73] Assignee: Alcatel N.V., Amsterdam, Netherlands

[21] Appl. No.: 281,083

[22] Filed: Dec. 7, 1988

[30] Foreign Application Priority Data

Dec. 8, 1987 [DE] Fed. Rep. of Germany ....... 3741455

[51] Int. Cl.$^5$ .................. G02F 1/295; G02F 1/035
[52] U.S. Cl. ...................... 385/11; 359/484; 359/247; 359/252; 359/487; 372/96; 372/106; 372/703
[58] Field of Search ...... 350/375, 377, 96.12, 350/96.13, 96.14, 384, 385, 386, 389, 390, 394; 372/96, 106, 703, 20

[56] References Cited

U.S. PATENT DOCUMENTS

| | | | |
|---|---|---|---|
| 3,407,364 | 10/1968 | Turner | 372/106 |
| 3,983,507 | 9/1976 | Tang et al. | 350/389 |
| 4,178,073 | 12/1979 | Uchida et al. | 350/377 |
| 4,375,910 | 3/1983 | Seki | 350/375 |
| 4,548,478 | 10/1985 | Shirasaki | 350/377 |
| 4,615,582 | 10/1986 | Lefevre et al. | 350/375 |
| 4,671,621 | 6/1987 | Dillon, Jr. et al. | 350/96.12 |
| 4,712,880 | 12/1987 | Shirasaki | 350/377 |
| 4,755,038 | 7/1988 | Baker | 350/96.14 |
| 4,772,084 | 9/1988 | Bogert | 350/96.14 |
| 4,784,470 | 11/1988 | Baker | 350/96.14 |
| 4,802,187 | 1/1989 | Bouley et al. | 372/20 |
| 4,803,692 | 2/1989 | Sakano et al. | 372/20 |
| 4,820,009 | 4/1989 | Thaniyavarn | 350/96.14 |

FOREIGN PATENT DOCUMENTS

| | | |
|---|---|---|
| 2945466 | 5/1981 | Fed. Rep. of Germany . |
| 60-10333 | 6/1985 | Japan . |
| 5194251 | 8/1986 | Japan . |

Primary Examiner—Rodney B. Bovernick
Assistant Examiner—Martin Lerner
Attorney, Agent, or Firm—Christie, Parker & Hale

[57] ABSTRACT

An improved optical isolator (6) for a semiconductor laser (2) for use in optical communication systems consists of a polarizer (4) and a birefringent medium (5). An electric field is applied to the birefringent medium (5) via electrodes (7) for varying the indices of refraction of the birefringent medium (5). By the variation of the indices of refraction, the optical isolator (6) can be adapted to different light wavelengths.

4 Claims, 1 Drawing Sheet

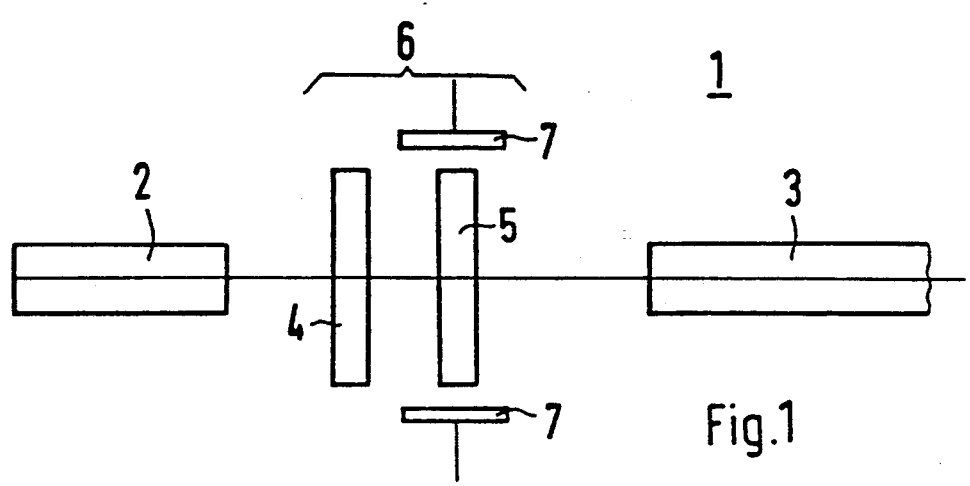
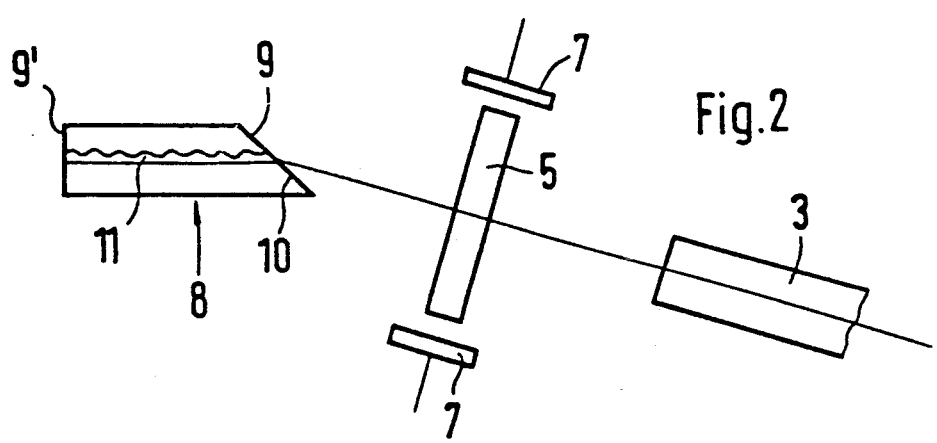
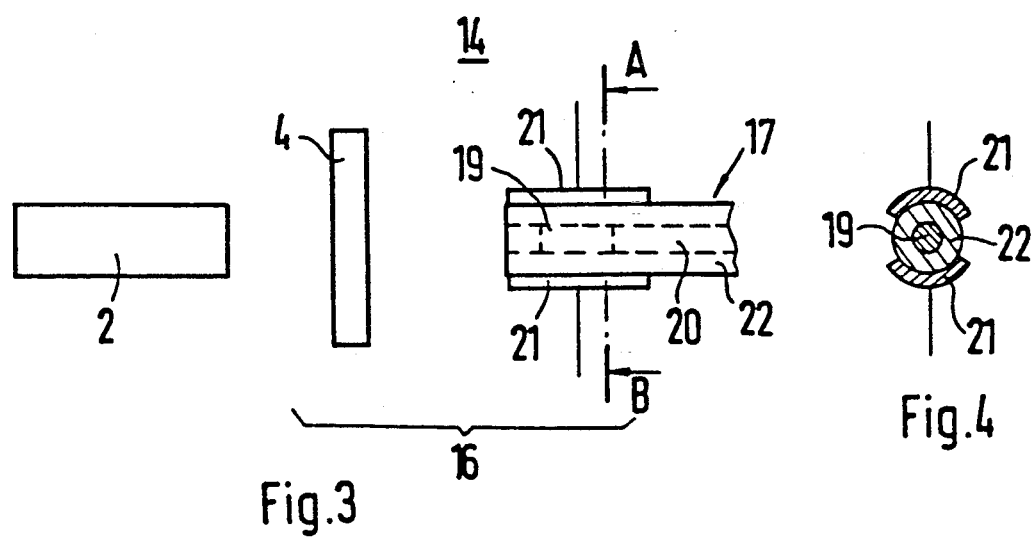

OPTICAL ISOLATOR

TECHNICAL FIELD

The present invention relates to an optical isolator

CLAIM FOR PRIORITY

This application is based on and claims priority from an application first filed in Fed. Rep. Germany on Dec. 8, 1988 under serial number P37 41 455.0. To the extent such prior application may contain any additional information that might be of any assistance in the use and understanding of the invention claimed herein, it is hereby incorporated by reference.

BACKGROUND ART

The performance of lasers used as optical transmitters in optical communication systems is impaired by reflections at, e.g., the end faces of optical fibers. Light is coupled back into the laser with a different phase position or a different polarization and produces parasitic modes in the laser which result in an undesired change of the emitted frequency or in a reduction of the emitted amplitude.

An arrangement for suppressing such a feedback is disclosed in published German Patent application DE-OS 29 45 466. It consists of a laser and an optical isolator constructed from a polarizer and a birefringent medium. The emitted laser light passes through the polarizer into the birefringenent medium, in which the linearly polarized light is converted into circularly polarized light. This circularly polarized light is coupled into an optical waveguide. Polarization conversion is achieved by arranging that the optical axis of the birefringent medium and the propagation direction of the incident light form a given angle dependent on the material of the birefringent medium, in that case 45°. The thickness d of the birefringent medium in the propagation direction of the light is given by $$d = \text{Lambda}_{vak} 4^{-1}(n_o - n_{ao})^{-1}(1 + 4K) \qquad \text{(Eq. 1)},$$

where $\text{lambda}_{vak}$ is the vacuum wavelength of the incident light, $n_o$ is the refractive index in the direction of the ordinary beam, $n_{ao}$ is the refractive index in the direction of the extraordinary beam, and K is an integer, in this case zero. A birefringent medium employed in this manner is also referred to as a "lambda/4 layer".

If the laser light having traversed the lambda/4-layer is reflected back into the lambda/4 layer, the circularly polarized light is linearly polarized again, with the plane of polarization of the reflected light being rotated by 90° with respect to that of the incident light. For the reflected light, the polarizer for the incident light thus acts as an analyzer through which the reflected light cannot pass.

From Eq. 1 it is apparent that the conversion of the light from one type of polarization to the other is performed correctly for only one wavelength, and that the lambda/4 layer must have precisely the required thickness. If either of these conditions is not satisfied, the polarization conversion will be incomplete and the reflected light will have a component which will be coupled through the analyzer back into the laser. The prior-art optical isolator is therefore usable for only one particular wavelength.

DISCLOSURE OF INVENTION

It is a basic object of the present invention to provide an optical isolator for that is effective for two or more wavelengths.

This object is attained in an arrangement of the above kind by the means of lectrodes for producing an electric field in the area of the birefringent medium.

Further advantageous aspects of the invention will become apparent as the description proceeds.

The principal advantages of the invention are that the refractive indices can be varied by applying an electric field to the birefringent medium, so that variations in the layer thickness d can be compensated for.

BRIEF DESCRIPTION OF DRAWINGS

Embodiments of the invention will now be described with reference to the accompanying drawings, in which:

FIG. 1 is a schematic representation of the invention;
FIG. 2 shows a first embodiment;
FIG. 3 shows another embodiment, and
FIG. 4 is a section taken along line A-B of FIG. 3.

BEST MODE FOR CARRYING OUT THE INVENTION

FIG. 1 shows schematically a first embodiment of an optical isolator 6 forming part of an optical transmitter 1. A polarizer 4 and a birefringent medium 5 in the form of a lambda/4 layer are interposed between a semiconductor laser 2 and an optical waveguide 3. The polarizer 4 and the birefringent medium 5 form the optical isolator 6. The birefringent medium 5 is so disposed between two electrodes 7 that an electric field can be produced in it. By this electric field, the refractive indices of the birefringent medium 5 can be varied. Especially suitable materials for the birefringent medium 5 are polymers based on polymethyl methacrylate (PMMA), which are naturally birefringent and are transparent in the light wavelength region used in optical communications. It is also possible to use materials which become birefringent as a result of the Faraday effect, such as an optically active YIG crystal.

Advantageously, the polarizer 4 and the birefringent medium 5 are integrated with the semiconductor laser 2, in which case the semiconductor laser 2 is provided with a thin polarizing layer on which an $SiO_2$ insulating layer and then a PMMA layer are deposited.

The wavelength of the radiation emitted by the semiconductor laser 2 can be either lambda = 1,300 nm or lambda = 1,500 nm. By changing the electric field applied to the birefringent medium 5, the refractive indices can be varied in such a way that Eq. 1 remains satisfied for a predetermined layer thickness d of the birefringent medium 5. This means that like birefringent media of the same size can be provided for optical transmitters 1 having different wavelength regions.

The optical isolator 6 according to the invention is particularly advantageous if the semiconductor laser 2 is a tunable laser. The optical isolator 6 is then continuously tuned in synchronism with the tunable laser, so that Eq. 1 is satisfied in all wavelength regions.

No stringent requirements are placed on the accuracy of the thickness d of the birefringent medium since any deviation from d can be compensated for by varying the electric field, so that Eq. 1 is satisfied again.

The strength of the electric field depends on the kind of the birefringent medium 5 and on the extent of the wavelength region over which the optical isolator 6 is to be tuned, or on the deviation from the predetermined thickness d of the birefringent medium 5.

The polarizer can be a reflecting medium. The incidence angle $beta_p$ of the laser light is determined by $\tan beta_p = n_2:n_1$ where $n_1$ is the refractive index of the ambient atmosphere, and $n_2$ is the refractive index of the reflecting medium. The reflected light consists only of light polarized at right angles to the plane of incidence. FIG. 2 shows a second embodiment of an optical isolator forming part of an optical transmitter. The semiconductor laser is a distributed-feedback (DFB) laser 8 which has an integral polarizer 10 formed by an oblique end face 9. Such DFB lasers 8 have an active layer 11 with a periodic grating structure and non-refractive end faces 9, 9'. The light is guided in the active layer 11. Reflection occurs not at the end faces 9, 9'of the DFB laser 8, but at the periodic grating structure of the active layer 11. The normal to the surface of the end 9 and the longitudinal axis of the DFB laser 8 include an angle $alpha_p$ determined by $\tan alpha_p = n_2:n_1$, where $n_1$ is the refractive index of the active layer 11, and $n_2$ is the refractive index of the ambient atmosphere. The end face 9 represents a so-called Brewster window, at which laser light with one plane of polarization is not reflected, while laser light with the other plane of polarization is reflected. Laser light emerging through this oblique end face 9 is thus polarized. Light scattered back through the birefringent medium 5 to the oblique end face 9 is reflected at the oblique end face 9 because its plane of polarization was rotated by 90°.

The birefringent medium 5, the electrodes 7, and the optical waveguide 3 are designed in the same manner as in the first embodiment.

In an embodiment representing another level of integration, an SiO$_2$ insulating layer is applied to the oblique end face 9, and a PMMA layer is deposited as a birefringent medium 5 on the SiO$_2$ layer.

FIGS. 3 and 4 show a further embodiment. An optical transmitter 14 includes a semiconductor laser 2, an optical isolator 16, and an optical fiber 17 as a waveguide. The optical isolator 16 consists of the polarizer 4, a birefringent medium 19 incorporated into the optical fiber 17, and electrodes 21 deposited on the cladding 22 of the optical fiber 17 by vacuum evaporation or sputtering.

The birefringent medium 19 occupies the space of the core 20 along the distance d. The refractive indices of the core 20 and birefringent medium 19 should be as close together as possible in order to avoid large scattering losses. Materials especially suited for the birefringent medium 19 are birefringent polymers based on polymethyl methacrylate (PMMA), whose refractive indices are in the range of 1.5 and, thus, in the range of the refractive indices for optical-fiber cores. The refractive indices can be adapted by changing the electric field in the birefringent medium 19.

In an embodiment representing a further level of integration, the end face of the optical fiber 17 is provided with an insulating layer on which the polarizer 4 is deposited.

If an optical isolator including a birefringent medium is used, circularly polarized light propagates in the optical fiber. This is a disadvantage in homodyne or heterodyne transmission systems, because in the receivers of such systems the light must be combined with that from a local oscillator. For this application, a further birefringent medium which converts circularly polarized light back into linearly polarized light is disposed at the end of the optical fiber.

We claim:
1. An optical isolator comprising:
2. An optical isolator as claimed in claim 1, wherein the field means comprises electrodes deposited on the cladding of the optical fiber.
3. Optical transmitter comprising
    a distributed feedback laser having a light-guiding layer and an oblique front end, such that the longitudinal axis of the laser is inclined with respect to the normal to the surface of the oblique front by the Brewster angle alpha which is defined by the relationship

$\tan alpha = n_2/n_1$, where $n_1$ is the refractive index of the light-guiding layer and $n_2$ is the refractive index of the ambient atmosphere, an optical waveguide,
    a birefringent medium having a predetermined thickness between the oblique front end of the laser and the optical waveguide,
    a plurality of electrodes for producing an electric field in the area of the birefringent medium, and
    voltage means for applying a control voltage to the electrodes such that the predetermined thickness of the birefringent medium functions as quarter wave plate at the particular frequency of linearly polarized light being output at the oblique front end of the laser and converts that linearly polarized light into circularly polarized light which is coupled into the waveguide.
    a polarizer for transmitting linearly polarized light having a predetermined first polarization axis,
    an optical fiber having a core surrounded by a cladding for transmitting circularly polarized light,
    a birefringent medium having a predetermined thickness and disposed in the core of the optical fiber between the polarizer and the remainder of the optical waveguide for converting linearly polarized light transmitted by the polarizer into the circularly polarized light transmitted by the optical waveguide,
    field means for producing an electric field in the area of the birefringent medium for causing said predetermined thickness of the birefringent medium to convert essentially all the linearly polarized light transmitted by the polarizer into the circularly polarized light transmitted by the optical waveguide for and to convert essentially all of the circularly polarized light that is reflected from the waveguide back into the birefringent medium into linearly polarized light having a second polarization axis essentially perpendicular to said first polarization axis, wherein the optical waveguide is an optical fiber having a core surrounded by a cladding and the birefringent medium is disposed in the core of the optical fiber.

4. Optical isolator comprising a polarizer for transmitting linearly polarized light having
    a predetermined first polarization axis, an optical waveguide for transmitting circularly polarized light,
    a birefringent medium consisting essentially of polymers based on polymethyl methacrylate, said birefringent medium having a predetermined thickness and being disposed between the polarizer and the optical waveguide for converting linearly polarized light transmitted by the polarizer into the circularly polarized light transmitted by the optical waveguide, and field means for producing an electric field in the area of the birefringent medium for causing said predetermined thickness of the birefringent medium to convert essentially all the linearly polarized light transmitted by the polarizer into the circularly polarized light transmitted by the optical waveguide for and to convert essentially all of the circularly polarized light that is reflected from the waveguide back into the birefringent medium into linearly polarized light having a second polarization axis essentially perpendicular to said first polarization axis.

* * * * *

UNITED STATES PATENT AND TRADEMARK OFFICE
CERTIFICATE OF CORRECTION

PATENT NO. : 5,044,713
DATED : September 3, 1991
INVENTOR(S) : Albrecht Mozer; Peter Kersten It is certified that error appears in the above-identified patent and that said Letters Patent is hereby corrected as shown below:

Abstract, line 7, change "(6) can" to -- (6) can --.

Column 1, line 6, after "isolator" insert a period.
Column 1, line 31, change "birefringenent" to -- birefringent --.
Column 2, line 4, after "isolator" delete "for".
Column 2, line 7, change "lectrodes" to -- electrodes --.

Column 4, line 4, rewrite claim 1 to read as follows:

-- 1. An optical isolator comprising
a polarizer for transmitting linearly polarized light having a predetermined first polarization axis,
an optical fiber having a core surrounded by a cladding for transmitting circularly polarized light,
a birefringent medium having a predetermined thickness and disposed in the core of the optical fiber between the polarizer and the remainder of the optical waveguide for converting linearly polarized light transmitted by the polarizer into the circularly polarized light transmitted by the optical waveguide,

UNITED STATES PATENT AND TRADEMARK OFFICE
CERTIFICATE OF CORRECTION

PATENT NO. : 5,044,713

DATED : September 3, 1991

INVENTOR(S) : Albrecht Mozer; Peter Kersten

It is certified that error appears in the above-identified patent and that said Letters Patent is hereby corrected as shown below:

field means for producing an electric field in the area of the birefringent medium for causing said predetermined thickness of the birefringent medium to convert essentially all the linearly polarized light transmitted by the polarizer into the circularly polarized light transmitted by the optical waveguide for and to convert essentially all of the circularly polarized light that is reflected from the waveguide back into the birefringent medium into linearly polarized light having a second polarization axis essentially perpendicular to said first polarization axis, wherein the optical waveguide is an optical fiber having a core surrounded by a cladding and the birefringent medium is disposed in the core of the optical fiber. --

Column 4, lines 8-62, rewrite claim 3 to read as follows:

-- 3. Optical transmitter comprising
a distributed feedback laser having a light-guiding layer and an oblique front end, such that the longitudinal axis of the laser is inclined with respect to the normal to the surface of the oblique front by the Brewster angle alpha which is defined by the relationship
$\tan \alpha = n_2/n_1$, where
$n_1$ is the refractive index of the light-guiding layer and
$n_2$ is the refractive index of the ambient atmosphere,

UNITED STATES PATENT AND TRADEMARK OFFICE
CERTIFICATE OF CORRECTION

PATENT NO. : 5,044,713

DATED : September 3, 1991

INVENTOR(S) : Albrecht Mozer; Peter Kersten

It is certified that error appears in the above-identified patent and that said Letters Patent is hereby corrected as shown below:

> an optical waveguide,
> a birefringent medium having a predetermined thickness between the oblique front end of the laser and the optical waveguide,
> a plurality of electrodes for producing an electric field in the area of the birefringent medium, and
> voltage means for applying a control voltage to the electrodes such that the predetermined thickness of the birefringent medium functions as quarter wave plate at the particular frequency of linearly polarized light being output a the oblique front end of the laser and converts that linearly polarized light into circularly polarized light which is coupled into the waveguide. --

Column 4, lines 62-68, column 5, lines 1-10, and column 6, lines 1-8, rewrite claim 4 to read as follows:

> -- 4. Optical isolator comprising
> a polarizer for transmitting linearly polarized light having a predetermined first polarization axis,
> an optical waveguide for transmitting circularly polarized light,
> a birefringent medium consisting essentially of polymers based on polymethyl methacrylate, said birefringent medium having a predetermined thickness and being disposed between the polarizer and the optical waveguide for converting linearly polarized light transmitted

UNITED STATES PATENT AND TRADEMARK OFFICE
CERTIFICATE OF CORRECTION

PATENT NO. : 5,044,713

DATED : September 3, 1991

INVENTOR(S) : Albrecht Mozer; Peter Kersten

It is certified that error appears in the above-identified patent and that said Letters Patent is hereby corrected as shown below:

by the polarizer into the circularly polarized light transmitted by the optical waveguide, and field means for producing an electric field in the area of the birefringent medium for causing said predetermined thickness of the birefringent medium to convert essentially all the linearly polarized light transmitted by the polarizer into the circularly polarized light transmitted by the optical waveguide for and to convert essentially all of the circularly polarized light that is reflected from the waveguide back into the birefringent medium into linearly polarized light having a second polarization axis essentially perpendicular to said first polarization axis. --

Signed and Sealed this

Ninth Day of March, 1993

Attest:

STEPHEN G. KUNIN

*Attesting Officer*    *Acting Commissioner of Patents and Trademarks*